United States Patent
Lee et al.

(10) Patent No.: US 7,461,180 B2
(45) Date of Patent: Dec. 2, 2008

(54) METHOD AND APPARATUS FOR SYNCHRONIZING USE OF BUFFER DESCRIPTOR ENTRIES FOR SHARED DATA PACKETS IN MEMORY

(75) Inventors: William Lee, Cary, NC (US); Trevor Garner, Apex, NC (US); Martin Hughes, Cary, NC (US); Dennis Briddell, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 11/430,116

(22) Filed: May 8, 2006

(65) Prior Publication Data

US 2008/0005296 A1 Jan. 3, 2008

(51) Int. Cl.
G05F 13/00 (2006.01)
G06F 15/173 (2006.01)

(52) U.S. Cl. ............... 710/22; 710/1; 710/4; 710/8; 710/9; 710/10; 710/52; 710/54; 710/55; 711/154; 711/169; 709/223

(58) Field of Classification Search ............... 710/1, 710/4, 8–10, 22, 310, 52, 54, 55; 711/154, 711/169; 709/223
See application file for complete search history.

(56) References Cited

U.S. PATENT DOCUMENTS

| 6,145,016 | A | * | 11/2000 | Lai et al. ............... 710/4 |
| 6,892,285 | B1 | | 5/2005 | Key et al. |
| 6,963,946 | B1 | * | 11/2005 | Dwork et al. ............ 710/310 |
| 6,976,142 | B1 | | 12/2005 | Schober |
| 2005/0256975 | A1 | * | 11/2005 | Kaniz et al. ............ 709/250 |

* cited by examiner

Primary Examiner—Tammara R Peyton
(74) Attorney, Agent, or Firm—Evans & Molinelli PLLC; Eugene Molinelli

(57) ABSTRACT

Techniques for synchronizing use of buffer descriptors for data, such as packets transmitted over a network, include receiving private index data that indicates a particular buffer descriptor owned by a DMA controller, for moving data between a data port and a corresponding memory buffer. A write command is placed on a memory exchange queue to change the owner to a different processor and the private index data is incremented. A public index is determined, which indicates a different buffer descriptor in which the owner is most recently changed to the processor and is known to be visible to the processor. In response to receiving a request from the processor for the most recent buffer descriptor changed to processor ownership, the public index data is sent to the processor. Based on the public index data, the processor exchanges data with buffer descriptors guaranteed to be owned by the processor.

30 Claims, 9 Drawing Sheets

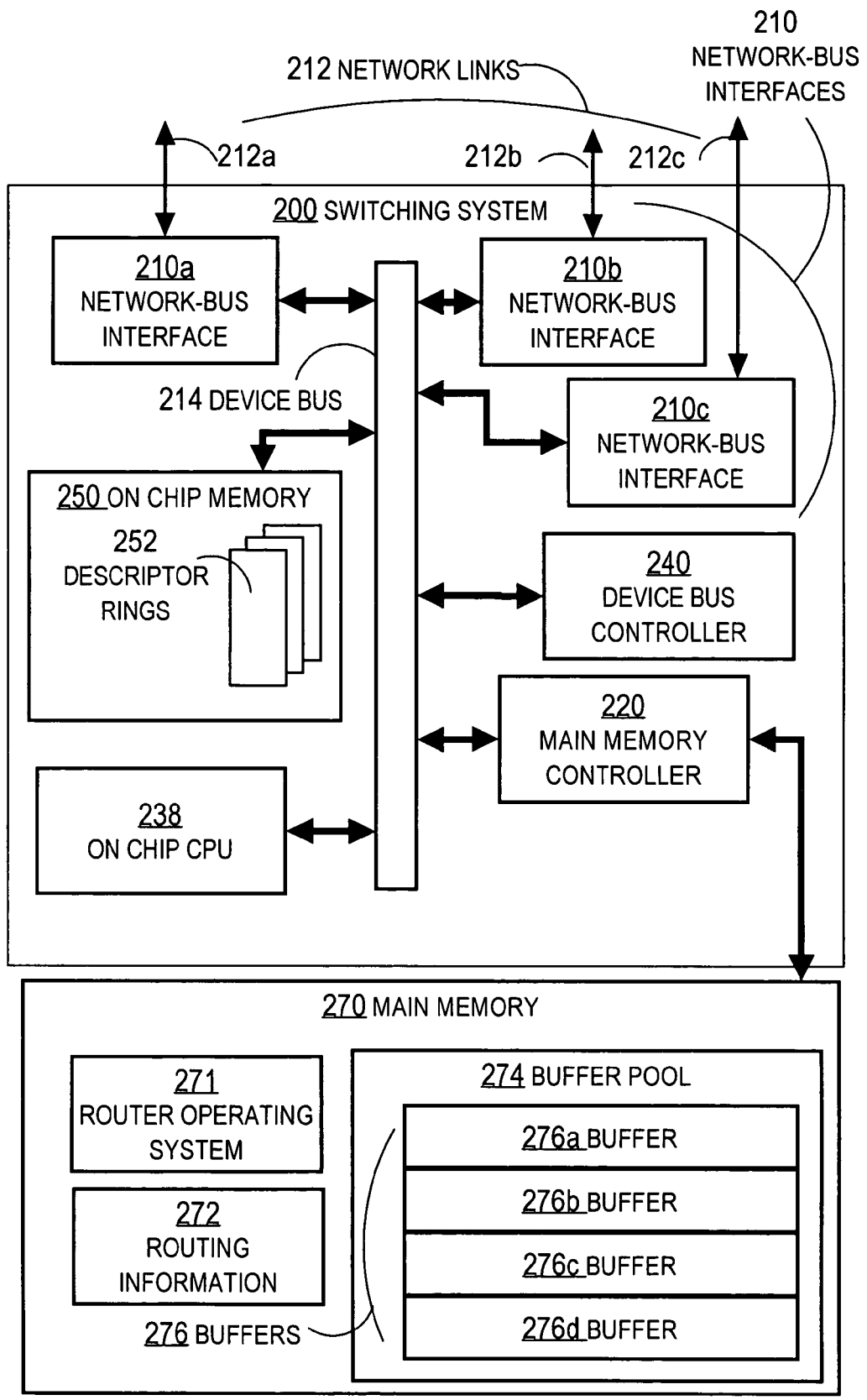

METHOD AND APPARATUS FOR SYNCHRONIZING USE OF BUFFER DESCRIPTOR ENTRIES FOR SHARED DATA PACKETS IN MEMORY

BACKGROUND OF THE INVENTION

1. Field of the Invention

The present invention relates to sharing use of descriptors for memory among multiple devices on the same data bus, and in particular to synchronizing the use of descriptors for memory buffers between a direct memory access (DMA) circuit block and a programmable processor.

2. Description of the Related Art

Networks of general purpose computer systems connected by external communication links are well known. The networks often include one or more network devices that facilitate the passage of information between the computer systems. A network node is a network device or computer system connected by the communication links.

Routers and switches are network devices that determine which communication link or links to employ to support the progress of data packets through the network. Routers and switches can employ software executed by a general purpose processor, called a central processing unit (CPU), or can employ special purpose hardware, or can employ some combination to make these determinations and forward the data packets from one communication link to another.

While the use of hardware causes data packets to be processed extremely quickly, there are drawbacks in flexibility. As communications protocols evolve through subsequent versions and as new protocols emerge, the network devices that rely on hardware become obsolete and have to ignore the new protocols or else be replaced. As a consequence, many network devices, such as routers, which forward packets across heterogeneous data link networks, include a CPU that operates according to an instruction set (software) that can be modified as protocols change. The software set constitutes a networking operating system, such as the Cisco Internet Operating System (IOS) available from Cisco Systems of San Jose, Calif.

Software executed operations in a CPU proceed more slowly than hardware executed operations, so there is a tradeoff between flexibility and speed in the design and implementation of network devices.

In many current routers, the data of a data packet are streamed to several memory buffers reserved for such use. A direct memory access (DMA) controller circuit block on any network interface and one or more CPUs in the router use these memory buffers to store, retrieve, use, and possibly modify the data packet after it is received on one link and before it is forwarded on the same or different link. To avoid collisions among the various components that use these buffers only one user at a time is given ownership of a buffer, e.g., an exclusive right to write to the buffer. In many routers this and other buffer management functions are supported by descriptor records (called descriptors herein) stored in a portion of local memory.

Each DMA block on a corresponding network interface is allocated a set of descriptors (sometimes divided into ingress descriptors for data packets being received and egress descriptor records for data packets being transmitted). Each descriptor indicates the location of a buffer in memory and indicates whether the DMA of that network interface or the CPU currently owns the descriptor and the corresponding buffer. Other information is also stored in each descriptor. Typically, the descriptors allocated to a DMA are arranged in one or more circular queues called rings, so that descriptors can be used in order and automatically cycle to the beginning of the portion of memory allocated to descriptors after reaching the end. The CPU assigns a free buffer location to ingress descriptors from a pool of free descriptors. The CPU moves descriptors from ingress rings to egress rings upon processing the received packet and the determination of the egress port. Buffers cleared after transmission of their data packet are collected in a buffer pool and reassigned to ingress descriptor rings of individual DMAs as appropriated.

When one stage of processing is completed, the status of a buffer is updated by writing to the associated one or more descriptors an update in which the ownership is changed to the next user of the data buffer. The DMA block includes a head pointer register that indicates a position in the descriptor ring where the next descriptor is to be written. For example an ingress head pointer register indicates a position in the ingress descriptor ring where is located a descriptor associated with a buffer for a newest data packet received by the network interface. The owner of this descriptor is changed to CPU during this update. Conversely, an egress head pointer register indicates a position in the egress descriptor ring where a descriptor, associated with a buffer for a newest data packet to be transmitted by the network interface, is updated with the buffer location where that data packet is already stored. In this case, the descriptor is updated by the CPU and the owner is changed to the DMA during the update. The DMA head pointer advances by one (including cycling automatically from the end of the allocated memory portion to the beginning) as each descriptor is updated with a new owner.

The next descriptor to be read is indicated by a tail pointer. A tail pointer is usually maintained by the CPU for ingress descriptor rings; in some routers, the DMA block also includes a tail pointer register. For example, the next descriptor to be read by the CPU on the ingress ring is indicated by an ingress tail pointer; and the next descriptor to be read by the DMA on the egress ring is indicated by an egress tail pointer.

When the CPU is ready to process data packets for one of the network interfaces (e.g., by reading descriptors on the ingress ring or writing descriptors on the egress ring), the CPU requests the value of the head pointer from the DMA. The DMA responds with the value of the head pointer. The CPU then processes a number of buffers based on the head pointer value returned from the DMA. For example, the difference between the head pointer returned by the DMA and the CPU's copy of the tail pointer is computed to determine the number of descriptors of this ingress ring that the CPU is to process.

While suitable for many cases, the above approach suffers deficiencies when there is a rapid rate of data packets being received or transmitted at one network interface. This problem arises because there is a latency in the access to memory operations used by the DMA and CPU. This latency can lead to a discrepancy between the value in the head pointer and the ownership of the descriptors returned in response to a read command.

Consider this example. On a link supported by a particular DMA block, a hundred data packets arrive of sizes sufficient to average four buffers per packet. The DMA reads the head pointer, retrieves the descriptor indicated, finds the associated buffer, fills that buffer, updates the descriptor, changing ownership to the CPU to further process the buffer, increments the head pointer, and then retrieves the next descriptor, repeating these steps 400 times. A queue of memory commands stack up at the DMA. Each command on the queue is sent in turn over a data communication channel to a memory device. A bus controller shares the bus among multiple DMA blocks on corresponding network interfaces, and may deny a DMA block access to the bus for some time as other components employ the bus. When the memory device receives the command, it responds by updating a portion of memory. The time from placing the memory command on the queue until the portion of memory is updated and visible for subsequent reads is the latency of the operation.

During these 400 operations, the CPU requests the head pointer value. The header value indicates 400 new descriptors past the tail pointer. The DMA responds to this CPU request at a high priority, bypassing commands in the queue. The CPU processes 400 descriptors on the ingress descriptor ring. However, due to latency, only 300 have been updated by the time the CPU reads the $301^{st}$ descriptor. This descriptor has not been updated and the CPU should not use the buffer pointed to by this descriptor.

In one approach to resolve the discrepancy, the CPU checks the ownership of each descriptor before using it. Thus, in the example, the CPU will see that the $301^{st}$ descriptor is still owned by the DMA block. The CPU will stop processing data packets from this interface, and move to processing data packets for another interface.

A disadvantage of this approach is that CPU processing is wasted as the CPU checks the ownership of every descriptor. Further waste is involved as overhead functions are executed to close down processing of a packet at mid-packet, and starting or restarting a different packet, also possibly mid-packet. Further waste of CPU and bus resources occur as the CPU polls the DMA or descriptor ring to determine when the descriptors to be processed are available. The result is perceptibly poor performance.

In another approach, the DMA responds to a request for the head pointer by placing a command in the queue, so the head pointer value is sent after the memory commands already in the queue.

A disadvantage of this approach is that it also wastes CPU resources. The CPU could process the first 300 buffers immediately but is forced to wait and do nothing with these buffers until all 400 are ready. There is also no guarantee that its position on the queue is on a packet boundary, so after waiting for those last 100 memory commands, the CPU is still faced with a mid-packet end of data; and, must expend resources to close down processing mid-packet for restarting at a later time. Further, there is no guarantee that the command issued before the response with the head pointer value will be completed before the CPU reads the associated descriptor, so the CPU might still consume resources checking the ownership of the descriptors.

Based on the foregoing, there is a clear need for techniques to synchronize the use of descriptors for memory buffers that do not suffer all the deficiencies of prior approaches. In particular, there is a need to guarantee that all descriptors read by a user up to a most recent descriptor indicated for that user are owned by that user. There is further particular need to guarantee that the descriptors being read end on a packet boundary to avoid the overhead of closing down processing mid-packet.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram that illustrates a switching system in a router that uses as main memory of the router, according to an embodiment;

DETAILED DESCRIPTION

A method and apparatus are described for synchronizing use of descriptors for buffers where data are shared among multiple components. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments are described in the context of sharing buffer descriptors between a CPU and DMA block used in a router for controlling the passage of data packets over a network; but, the invention is not limited to this context. In other embodiments, the synchronization of buffer descriptors may be performed in any device alternating ownership of the buffer descriptors between any two separate component sharing the same data bus and memory. For example, in some embodiments, two ports on a switch each with DMA engines can pass packets between shared memory using descriptors and this invention.

1.0 Network Overview

Figure 1:
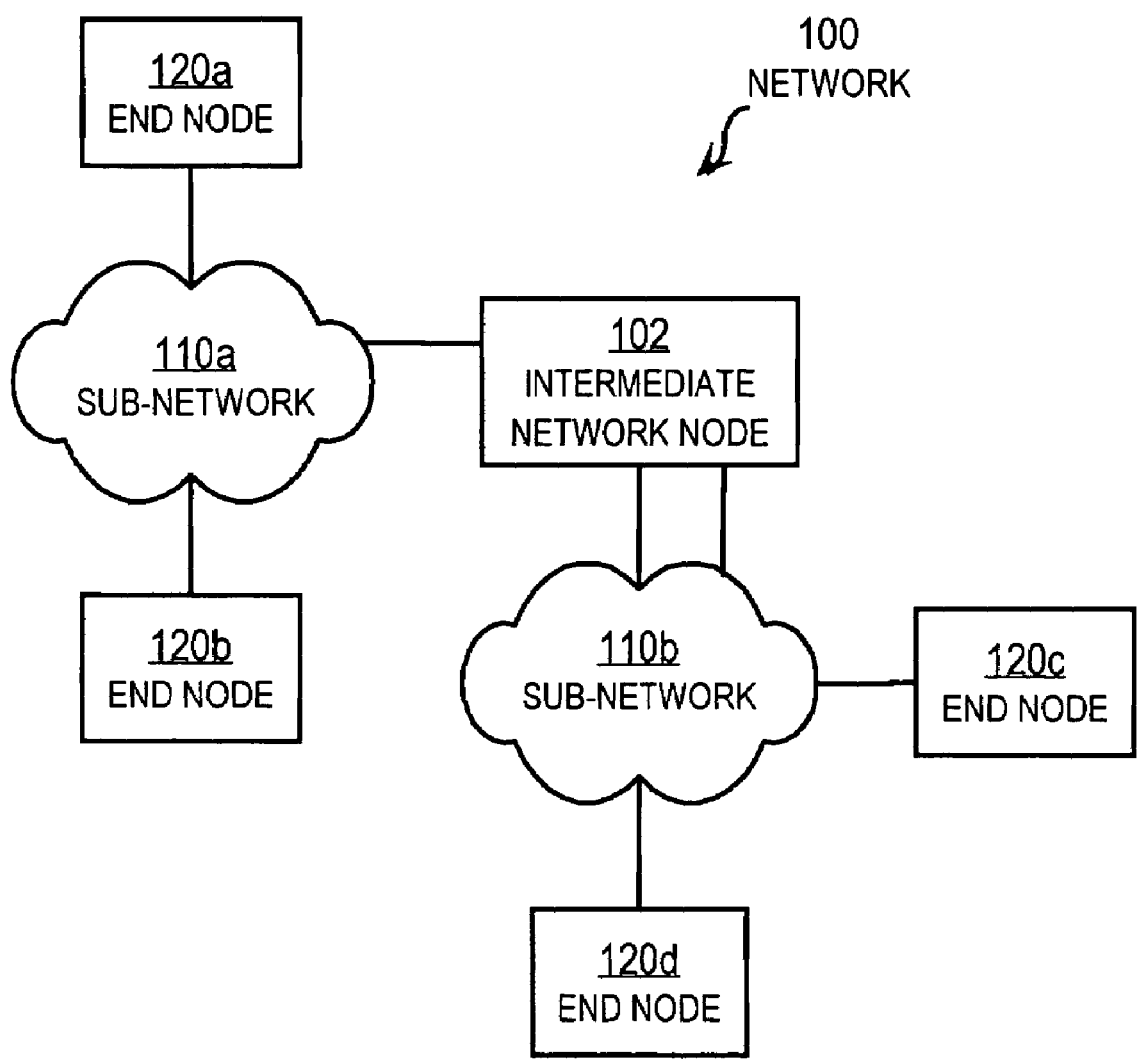
FIG. 1 is a block diagram that illustrates a network, according to an embodiment.

FIG. 1 is a block diagram that illustrates a network 100, according to an embodiment. A computer network is a geographically distributed collection of interconnected sub-networks (e.g., sub-networks 110a, 110b, collectively referenced hereinafter as sub-network 110) for transporting data between nodes, such as computers, personal data assistants (PDAs) and special purpose devices. A local area network (LAN) is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, e.g., intermediate network node 102, such as a router or switch, that facilitates routing data between end nodes 120. As used herein, an end node 120 is a node that is configured to originate or terminate communications over the network. In contrast, an intermediate network node 102 facilitates the passage of data between end nodes. Each sub-network 110 includes zero or more intermediate network nodes. Although, for purposes of illustration, intermediate network node 102 is connected by one communication link to sub-network 110*a* and thereby to end nodes 120*a*, 120*b* and by two communication links to sub-network 110*b* and end nodes 120*c*, 120*d*, in other embodiments an intermediate network node 102 may be connected to more or fewer sub-networks 110 and directly or indirectly to more or fewer end nodes 120 and directly to more other intermediate network nodes.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999.

Communications between nodes are typically effected by exchanging discrete packets of data. Each data packet typically comprises 1] header information associated with a particular protocol, and 2] payload information that follows the header information and contains information to be processed independently of that particular protocol. In some protocols, the packet includes 3] trailer information following the payload and indicating the end of the payload information. The header includes information such as the source of the data packet, its destination, the length of the payload, and other properties used by the protocol. Often, the data in the payload for the particular protocol includes a header and payload for a different protocol associated with a different, higher layer of the OSI Reference Model.

The intermediate node (e.g., node 102) typically receives data packets and forwards the packets in accordance with predetermined routing information that is distributed in data packets using a routing protocol According to some embodiments of the invention described below, the intermediate network node 102 is configured to store data packets in buffers between reception and transmission and to manage access to those buffers internally with descriptors that are shared between network interfaces to links and one or more CPUs in the node.

2.0 Structural Overview

A router which may serve as the intermediate network node 102 in some embodiments is described in greater detail in a later section with reference to FIG. 5. At this juncture, it is sufficient to note that the router 500 includes a general purpose processor 502 (i.e., a CPU), a main memory 504, and a switching system 530 connected to multiple network links 532. According to some embodiments of the invention, switching system 530 is modified as described in this section.

FIG. 2A is a block diagram that illustrates a switching system 200 that uses a main memory 270 of a router (e.g., memory 504 of router 500) to buffer and control the routing of data packets across network links 212 (e.g., 532), according to an embodiment. The switching system 200 includes a device bus 214, device bus controller 240, multiple network-bus interfaces 210, on-chip CPU 238, main memory controller 220 and on-chip memory 250.

The device bus 214 is a local bus for passing data between the components of switching system 200. In some embodiments, the device bus 214 is a fast device bus (FDB) that has greater bandwidth than a main bus used with main memory, such as bus 510 depicted in FIG. 5 and described in a later section.

Each network-bus interface 210, such as network-bus interfaces 210*a*, 210*b*, 210*c*, includes circuitry and logic to couple the device bus 214 to a network link 212, as described in more detail below.

The main memory controller 220 comprises circuitry and logic configured to store and retrieve data in main memory 270. In some embodiments, main memory controller 220 is connected directly to a main bus for transferring data to the main memory.

The on-chip CPU 238 is a general purpose processor that performs operations on data based on instructions received by the CPU 238, as described in more detail below for processor 502. In some embodiments, multiple on-chip CPUs are included. Although the illustrated on-chip CPU 238 is situated in the switching system 200, it is also expressly contemplated that the on-chip CPU may reside in a separate module coupled to the switching system 200, or the functions performed by the on-chip CPU 238 (or a portion thereof) may be performed by a separate CPU connected to the main bus (such as CPU 502 connected to main bus 510, described below). In some embodiments, on-chip CPU 238 is omitted.

The bus controller 240 comprises circuitry and logic that, among other operations, implements an arbitration policy for coordinating access to the device bus 214. That is, the controller 240 prevents two or more entities, such as the network-bus interfaces 210, memory controller 220, etc., from attempting to access the bus 214 at substantively the same time. To that end, the bus controller 240 may be configured to grant or deny access to the bus 214 based on a predefined arbitration protocol.

The on-chip memory 250 comprises a set of addressable memory locations resident on the switching system 200. The on-chip memory 250 is included in some embodiments to improve performance for frequently accessed data. In some embodiments, on-chip memory 250 is omitted. The on-chip memory may be a form of volatile memory, such as static RAM (SRAM), or a form of erasable non-volatile memory, such as Flash memory. Although the illustrated on-chip memory 250 is situated in the switching system 200, it is also expressly contemplated that the on-chip memory may reside in a separate memory module coupled to the switching system 200, or the contents of the on-chip memory (or a portion thereof) may be incorporated into the main memory 270.

In the illustrated embodiment, the on-chip memory 250 stores, among other things, one or more descriptor rings 252. As used herein, a ring is a circular first-in, first-out (FIFO) queue of records, where a record is a number of fields stored in a certain number of octets, where an octet is eight binary digits (bits). Each network interface in a network bus interface 210 is associated with at least one ring 252 in the on-chip memory 250.

The main memory 270 includes instructions from a router operating system 271, routing information 272, and a buffer pool 274. The buffer pool includes multiple buffers 276 of a certain size, e.g., buffers 276*a*, 276*b*, 276*c*, 276*d*, for storing data from one or more packets. In an illustrated embodiment, buffers 276 are each two thousand forty eight bytes (2 kilobytes, kB) in size; sufficient to hold an entire non-jumbo Ethernet (E/N) packet, which is always less than 1,518 bytes in size. Data from no more than one packet is held in any one buffer. Several buffers 276 are used to hold a jumbo E/N packet greater than 2 kB in size.

When a packet is received at a network interface, data from the packet is forwarded by the network-bus interface 210 using the main memory controller 220 to an available data buffer 276 in the main memory 270. The router operating system instructions 271 causes the on-chip CPU (238) to issue a memory write to the data buffer, and a memory reference to be inserted in a descriptor record which is enqueued in the descriptor ring 252 in on-chip memory 250 and associated with the network bus interface 210 that received the packet. Data from the packet is stored in the buffers 276 and descriptors are enqueued in this manner until the network bus interface 210 determines that an entire packet 130 has been received or an error has occurred. Accordingly, the network interface's descriptor ring 252 stores an ordered list of descriptor records corresponding to the order in which the data in a packet is received at the interface of a network-bus interface.

Figure 2B:
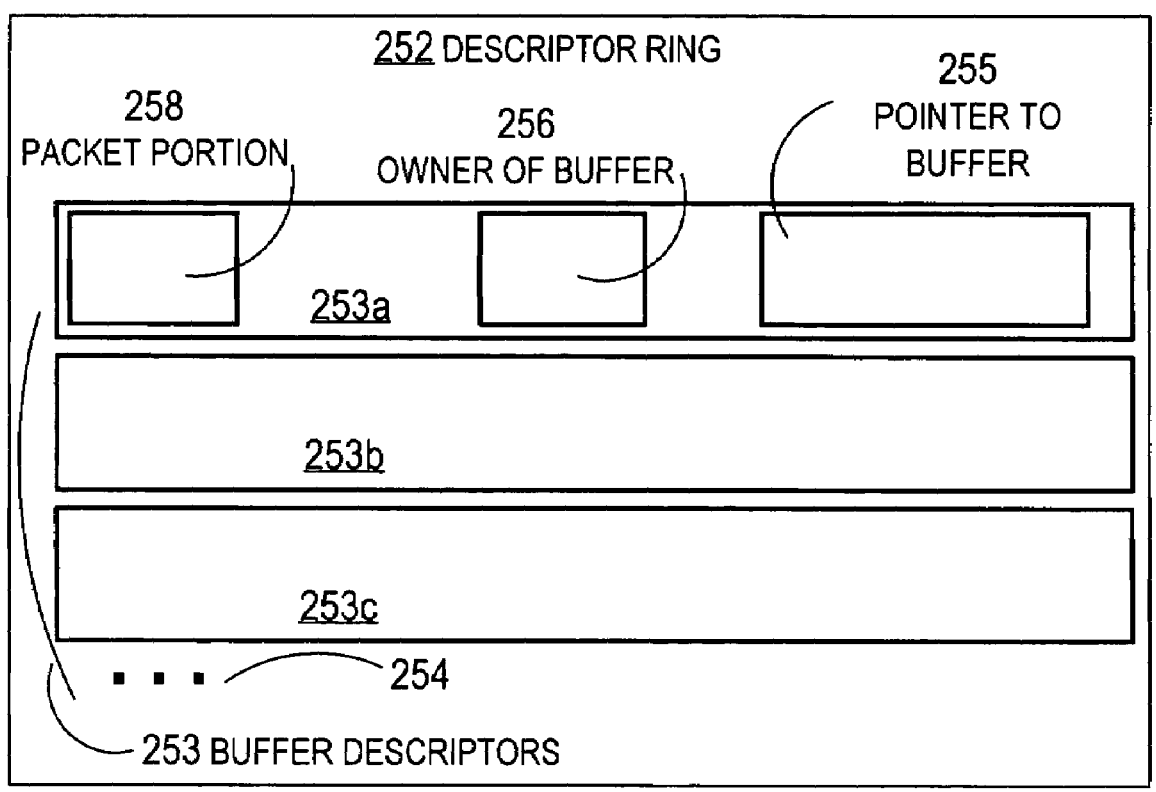
FIG. 2B is a block diagram that illustrates a descriptor ring, according to an embodiment.

FIG. 2B is a block diagram that illustrates descriptors 253, including descriptors 253a, 253b, 253c, and others indicated by ellipsis 254, in a descriptor ring 252 in on-chip memory, according to an embodiment. In the illustrated embodiment, descriptors, e.g., descriptor 253a, include a pointer field 255, an owner field 256 for the data from the packet, and a packet portion field 258. The pointer field 255 holds data that indicates the location of a data buffer 276 where the data from a packet is or will be stored, e.g., 276b. The owner field 256 holds data that indicates whether the CPU or the network bus interface 210 or some other component has ownership of the descriptor record 253 and the associated data buffer, e.g., buffer 276b. The packet portion field 258 holds data that indicates what portion of a whole packet is represented by the buffer pointed to in the current or subsequent descriptors 253. For example, in some embodiments the packet portion field 258 holds data that indicates whether the current buffer is the start of a data packet, or the end of the data packet, or neither. In some embodiments, the packet portion field 258 holds data that indicates a start of the packet and a length of the packet, so it can be determined whether a subsequent descriptor points to a different buffer of the same data packet.

Figure 2C:
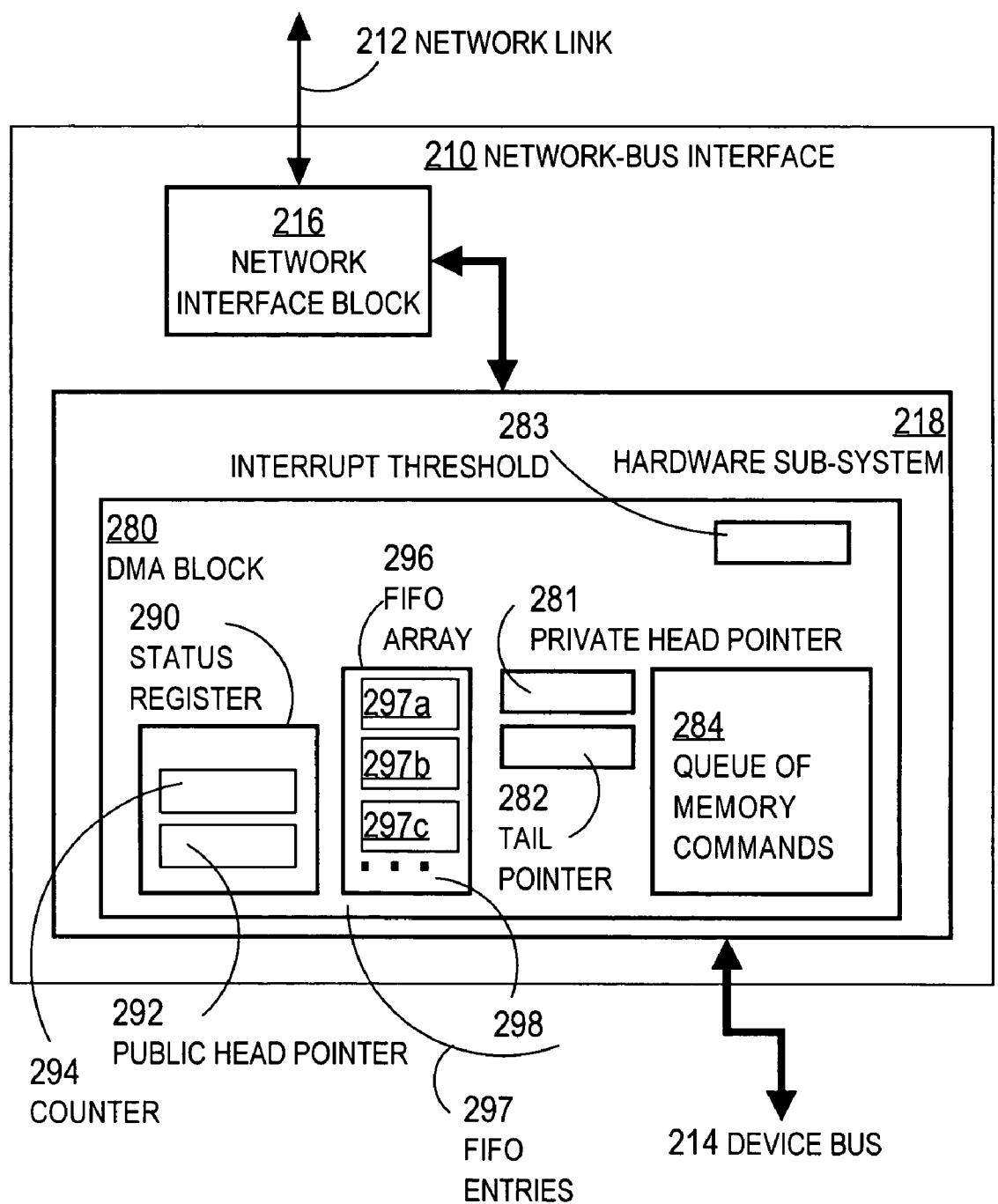
FIG. 2C is a block diagram that illustrates a DMA block configured to keep and use a public head pointer that guarantees ownership for a user, according to an embodiment in a router.

FIG. 2C is a block diagram that illustrates a network-bus interface 210, according to an embodiment. The network-bus interface 210 includes a network interface block 216 connected to network link 212 and a hardware sub-system 218 connecting the device bus 214 to the network interface block 216. Sub-system 218 includes circuitry and logic configured to send and receive data over a bus coupled to a network interface block 216. Data received at a network interface block 216 is forwarded over a bus to sub-system 218, which frames the received data so it may be transferred over the device bus 214. Conversely, the subsystem 218 may receive data from the device bus 214 and reformat the data for transmission over the bus to network interface block 216. The network interface block 216 may use any bus known in the art at the time the interface 210 is implemented, to exchange data with hardware sub-system 218, including the IEEE 802.3u clause 22.4 Media Independent Interface (MII). Additionally, the Network-Bus Interface subsystem (block) 210 can be an external chip where any bus known in the art at the time the interface 210 is implemented, to exchange data with the hardware subsystem 218 such as peripheral component interconnect (PCI) buses, Industry Standard Architecture (ISA) buses, Extended ISA (EISA) buses, among others.

In some embodiments, an integrated circuit chip includes the fast device bus 214 and all components connected to fast device bus 214, including a hardware subsystem 218 on each network-bus interface 210, and including device bus controller 240, main memory controller 220, on-chip memory 250 and on-chip CPU 238. Network interface blocks 216 in the network-bus interfaces 210 may be implemented as separate chips on a circuit board assembled to implement a router. Other components of a router, such as main memory, are provided as one or more additional chips on a circuit board to implement the router.

In the illustrated embodiment, the hardware sub-system 218 in network-bus interface 210 includes a direct memory access (DMA) block 280. DMA block 280 includes circuitry and logic to store and access data in the on chip memory 250, such as descriptors in descriptor rings 252, and in main memory 270, such as packet data in buffers 276. The DMA block 280 includes the head pointer register 281, tail pointer register 282, interrupt threshold register 283 and queue 284 of memory commands. The head pointer 281, as described above holds data that indicates a position in a descriptor ring associated with DMA block 280 where the next write to the descriptor ring occurs. The tail pointer, as described in the background section holds data that indicates a position in a descriptor ring associated with DMA block 280 where the next read from the descriptor ring occurs. Descriptors between the tail, inclusive, and the head, exclusive, are intended to be read and processed. The queue 284 is a FIFO array of registers with memory read and write commands (collectively called herein memory exchange commands) issued by the DMA and waiting for access to the device bus 214. Residence time in queue 284 contributes to latency between updating contents of head pointer register 281 and having the updated descriptor viewed by a downstream component, such as CPU 238. Interrupt threshold register 283 holds data that indicates how many descriptors owned by the CPU may accumulate in a descriptor ring (e.g., ring 252) before the DMA issues an interrupt to jolt the CPU into starting on processing the descriptors owned by the CPU.

According to some embodiments of the invention, described in more detail below with reference to FIG. 4A and FIG. 4B, the DMA block 280 is modified to includes status register 290 and FIFO array 296 in addition to registers 281, 282, 283 and queue 284. The status register 290 and FIFO array 296 are used to distinguish descriptors updated by the DMA from descriptors at which updates are visible to users of the descriptor ring other than the DMA block 280.

The status register 290 includes public head pointer register 292 and counter 294. The public head pointer register 292 holds data (e.g., an index) that indicates a position in a descriptor ring associated with DMA block 280 up to which the most recent write to the descriptor ring is visible to users of the descriptor ring other than the DMA block. Similarly, the counter register 294 holds data that indicates how many descriptors were updated and had ownership returned to the CPU and are waiting to be processed by the CPU.

The FIFO array of registers 296 includes one or more FIFO entries 297, including FIFO entry 297a, entry 297b, entry 297c and others indicated by ellipsis 298. Each FIFO entry 297 is associated with a memory exchange command (e.g., a non-posted write) to any memory location that causes a notification to be issued when the result of the command is visible to subsequent memory commands (e.g., reads) directed to the same memory location by other users. Such commands are called herein notification memory commands. Each FIFO entry 297 holds data that indicates an amount to advance the public head pointer in register 292 when notification is received. As each notification is received at DMA block 280, a oldest FIFO entry (e.g., entry 297a) is examined and removed ("popper") from FIFO array 296, and the contents of the status register 290 are advanced based on the contents of that oldest FIFO entry 297a. As described in more detail below, in some embodiments the public header is also aligned with a packet boundary. In such embodiments, the amount to advance the public head pointer 292 is 0 when the associated memory command is not associated with a packet boundary. For example, only the write of the last descriptor of a packet causes the public head pointer to advance by the quantity of descriptors for the associated packet

3.0 Functional Overview

According to various embodiments, DMA block 280 keeps track of descriptor updates that are visible to other users of its descriptor ring, and uses this information to time interrupts to a CPU or respond to requests from the CPU for the head pointer for the most recently updated descriptor, or both. Any method may be used to track the visible updates and distinguish them from updates that are still subject to memory command latency. The use by the CPU of only visible descriptor updates eliminates wasteful processing and polling by the CPU and improves performance of a router. In some embodiments, the head pointer returned is also guaranteed to be on a packet boundary.

Figure 3A:
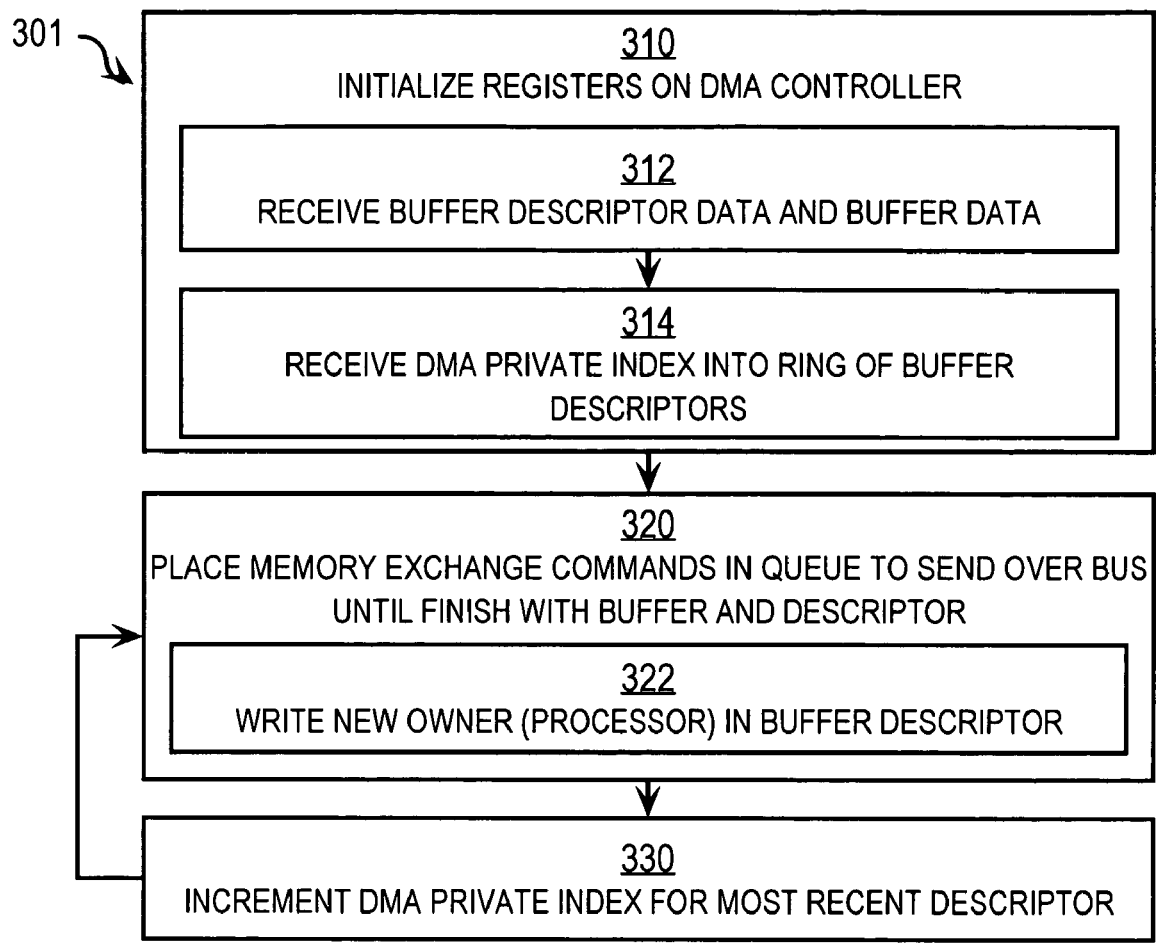
FIG. 3A, FIG. 3B and FIG. 3C are flow diagrams that illustrate at a high level a method at a DMA block for synchronizing use of descriptors, according to an embodiment.

FIG. 3A is a flow diagram that illustrates at a high level a method 301 at a DMA block for synchronizing use of descriptors, according to an embodiment. Although steps are depicted in FIG. 3A, and subsequent flow diagrams, in a particular order for the purposes of illustration, in other embodiments one or more steps may be performed in a different order, or overlapping in time by one or more serial or parallel processes, or may be omitted entirely, or changed in some combination of ways.

In step 310 registers on the DMA block (e.g., DMA block 280) are initialized. In many embodiments this is performed by the CPU (e.g., on-chip CPU 238). In some embodiments, the registers are initialized by other means, such as from a read-only memory (ROM) on the DMA block. In an illustrated embodiment, the initialized contents of the counter register 294 and the FIFO array of registers 296 are null, e.g., all zeroes; and the initial value in the public head pointer register and the tail pointer register 282 is the address of the first descriptor in the descriptor ring. When these two values are the same, it indicates that no descriptors are available for processing. It is assumed for purposes of illustration that this address is the hexadecimal value AAA0, where each digit represents a numeral for a base 16 system and the digits for the decimal values 10 through 15 are represented by the letters A through F, respectively.

In some embodiments, step 310 includes step 312 and step 314. In step 312, the DMA receives data that indicates the location and size of one or more descriptor rings portions of on-chip memory. For example, DMA block 280 receives data that indicates the location and size of two descriptor rings in on-chip memory 250—one for use as an ingress descriptor ring and one to use as an egress descriptor ring. The ingress ring is initialized with DMA ownership in owner field 256 and pointers in field 255 to empty buffers 276 in the main memory 270. The egress ring is initialized with CPU ownership and null values for pointers in field 255. In step 314, an initial value is received at the DMA block for a private index into the descriptor ring, e.g., a value that indicates a first location in the corresponding descriptor ring. For example, on-chip CPU 238 sets register 281 to the value AAA0 that is the first location in the ingress descriptor ring.

In the following, for purposes of illustration, the effect of method 300 on the descriptors and pointers for an ingress descriptor ring are given by way of example. Analogous steps apply to the descriptors and pointers of an egress descriptor ring.

In step 320, the DMA begins to issue memory exchange commands to update the contents of descriptors in the DMA block's own descriptor rings and the buffers to which the descriptors point. For example, as data for a data packet is received over network link 212, the DMA determines the destination buffer (e.g., 276c) for this data based on the pointer field 255 in the first descriptor indicated by the contents of private head pointer register 281. As the data is written to that buffer in one or more memory write commands, the status of the buffer is determined, such as the buffer's use as the first buffer of the data packet. Step 320 includes step 322. When the buffer is full, the status of the buffer is updated during step 322 in a write command to the first descriptor in the descriptor ring. During step 322, data that indicates the CPU is written into the owner field 256 to indicate the transfer of ownership to the CPU for further processing During step 320, each of these memory exchange commands is placed in order on the queue 284 to be executed as latency in the DMA block 280, device bus 214 and memory 250, 270 allows.

In step 330, the DMA updates the private head pointer register 281 to indicate the next descriptor in the ingress ring. For example, the DMA updates the contents of register 281 to the value AAA1. Control then passes back to step 320 to generate memory exchange commands for the next buffer.

Figure 3B:
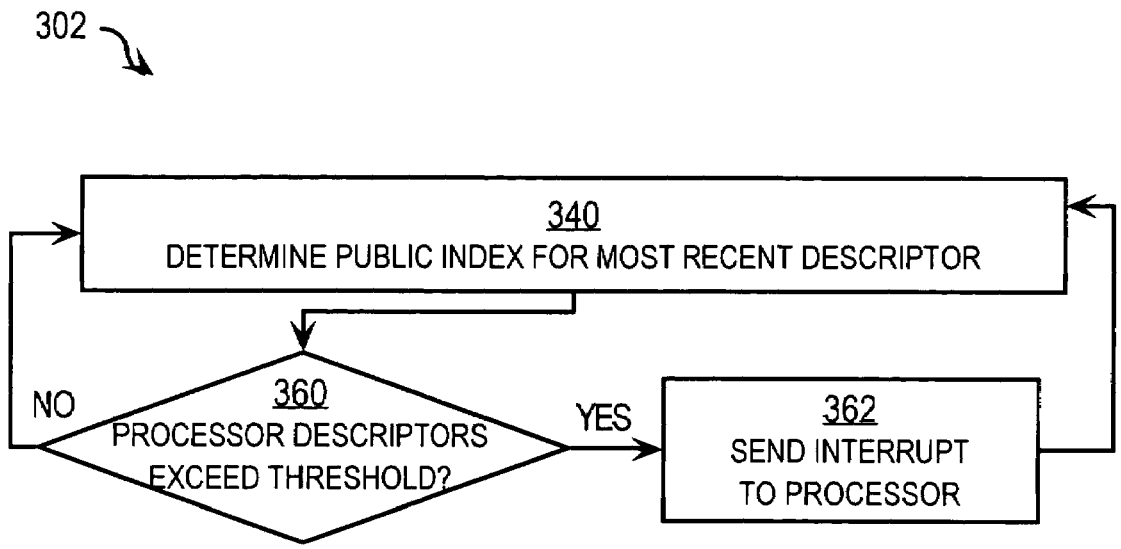

FIG. 3B is a flow diagram that illustrates at a high level a method 302 at a DMA block for synchronizing use of descriptors, according to an embodiment. In the illustrated embodiment method 302 is performed in a process that runs in parallel with method 301. In step 340, the DMA determines the public head pointer and updates the public head pointer register 292. The public head pointer indicates the location of the first descriptor after the most recent descriptor written that is also visible to other users of the descriptor ring, such as the CPU, so processing is done for descriptors up to but not including the descriptor whose location is indicated by the head pointer. Any method may be used to determine whether the most recent descriptor in a write command from the DMA block is visible to other users. An embodiment that relies on notification memory commands and FIFO array 296 is described in more detail below with reference to FIG. 4A. In some embodiments, the public head pointer register is only updated for the last descriptor of a data packet, on a boundary with descriptor for the next packet stored in the buffers.

For purposes of illustration, it is assumed that, because of latency, the updated first descriptor is not yet visible in the ingress descriptor ring in on-chip memory 250. Therefore, it is determined in step 340 that there is no change to the public index in the public head pointer register.

In step 360, it is determined whether the number of descriptors that are now owned by the CPU exceed the threshold stored in interrupt threshold register 283. For example, it is determined whether the contents of counter register 294 exceed the contents of the interrupt threshold register 283. This is consistent with prior approaches, in which the number of descriptors owned by the CPU was determined based solely on the number of writes sent by the DMA that changed ownership to the CPU.

In some embodiments, step 360 uses instead the number of CPU owned descriptors that are also visible to the CPU. Because of latency, this value can be different from the value used in prior approaches. In these embodiments, the value indicated by data stored in counter register 294 is the number of descriptors that are visible to the CPU.

If the contents of counter 294 exceed the threshold, then control passes to step 362 to send an interrupt to the CPU to begin processing the descriptors in the DMA descriptor ring that are owned by the CPU. Step 362 as used in conventional systems is also used in the illustrated embodiment. Control then passes back to step 340. If the contents of the counter do not exceed the threshold, control passes directly back to step 340, without sending an interrupt to the CPU. In the example so far described, the counter register 294 is empty and does not exceed the threshold, so control passes directly to step 340.

Figure 3C:
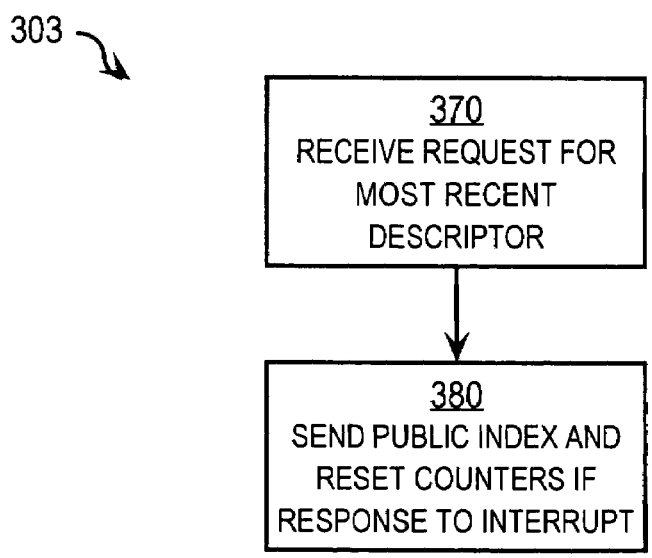

FIG. 3C is a flow diagram that illustrates at a high level a method 303 at a DMA block for synchronizing use of descriptors, according to an embodiment. In the illustrated embodiment method 303 is performed in a process that runs in parallel with method 301 and method 302. In step 370, a request is received from the CPU for a head pointer to indicate a most recent descriptor updated by the DMA. For example, a diagnostic program requests this information from the DMA. More often, it is expected, the request is received in a high-priority response to sending the interrupt, in step 362.

After a request is received from the CPU for the head pointer, control passes to step 380. In step 380 the contents of the public head pointer register 292 are sent to the CPU in response to the request. If the request was received in response to an interrupt, the response is considered top priority and is sent over the data bus 214 ahead of any memory exchange commands in the queue 284. It is well known in the art how to associate a request for a head pointer with an interrupt.

Thus, CPU resources are conserved as the CPU receives a head pointer value as fast as is physically possible so that the CPU is not made to wait excessively. Furthermore, since the head pointer value returned is for a descriptor that is guaranteed to show CPU ownership, the CPU need not consume resources to check for ownership, such as checking each descriptor read or waiting and polling the ownership bit in the descriptor indicated by the head pointer until it indicates the CPU. Furthermore, in those embodiments in which the public head pointer register holds a pointer to the last visible descriptor for an entire data packet, the CPU does not expend resources to terminate or resume processing mid-packet, as occurs in prior approaches.

Also during step 380, the contents of the counter register 294 are reset to zero if the request in step 370 is received in response to the interrupt sent in step 362. Thus the counter register 294 holds data that indicates the number of visible descriptors in the descriptor ring with CPU ownership added since the last interrupt.

4.0 Example Embodiment

The method of FIG. 3A. FIG. 3B and FIG. 3C is now illustrated in greater detail for a particular embodiment using notification memory commands. Notification memory commands are available on many systems. For example, some systems support non-posted writes. In a non-posted write, a memory controller on a memory device, such as on-chip memory 238 and main memory 270, issues an acknowledgement when the write is completed and sends the acknowledgement to the device that issued the non-posted write just completed. A DMA block that receives such an acknowledgement can guarantee that the CPU will be able to see the data just acknowledged. The acknowledgement, as shown below, is used to update the public head pointer register 292 and counter register 294.

A disadvantage of the non-posted write is that it consumes more resources on the memory device and the data bus. When throughput of the memory device is controlling the overall performance of the router, the extra load on the memory device is undesirable.

Some systems support data bus acknowledgment of posted writes. In such systems, the device bus controller 240 is intelligent enough to schedule memory command messages so that multiple commands to the same memory are performed in the order in which request for access to the bus are received at the device bus controller 240. In these systems, the device bus controller issues a bus acknowledgement when a bus access request for a posted write command is received. When the DMA block receives this bus acknowledgement, the DMA is assured that, though the command might not yet have access to the bus or arrived yet at the target memory location, a subsequent read or write to the same memory device will be performed in the proper sequence after the acknowledged posted write. Thus a read received from the CPU after the bus acknowledgment is sent will not be given access to the device bus until after the acknowledged posted write command has been given access.

An advantage of the bus-acknowledged posted write is that it consumes fewer resources on the device bus. When throughput of the device bus is controlling the overall performance of the router, the lighter load on the device bus is desirable. For purposes of illustration, it is assumed that device bus 214 supports bus acknowledgement of posted writes; and that all writes by the DMA are posted writes.

Figure 4A:
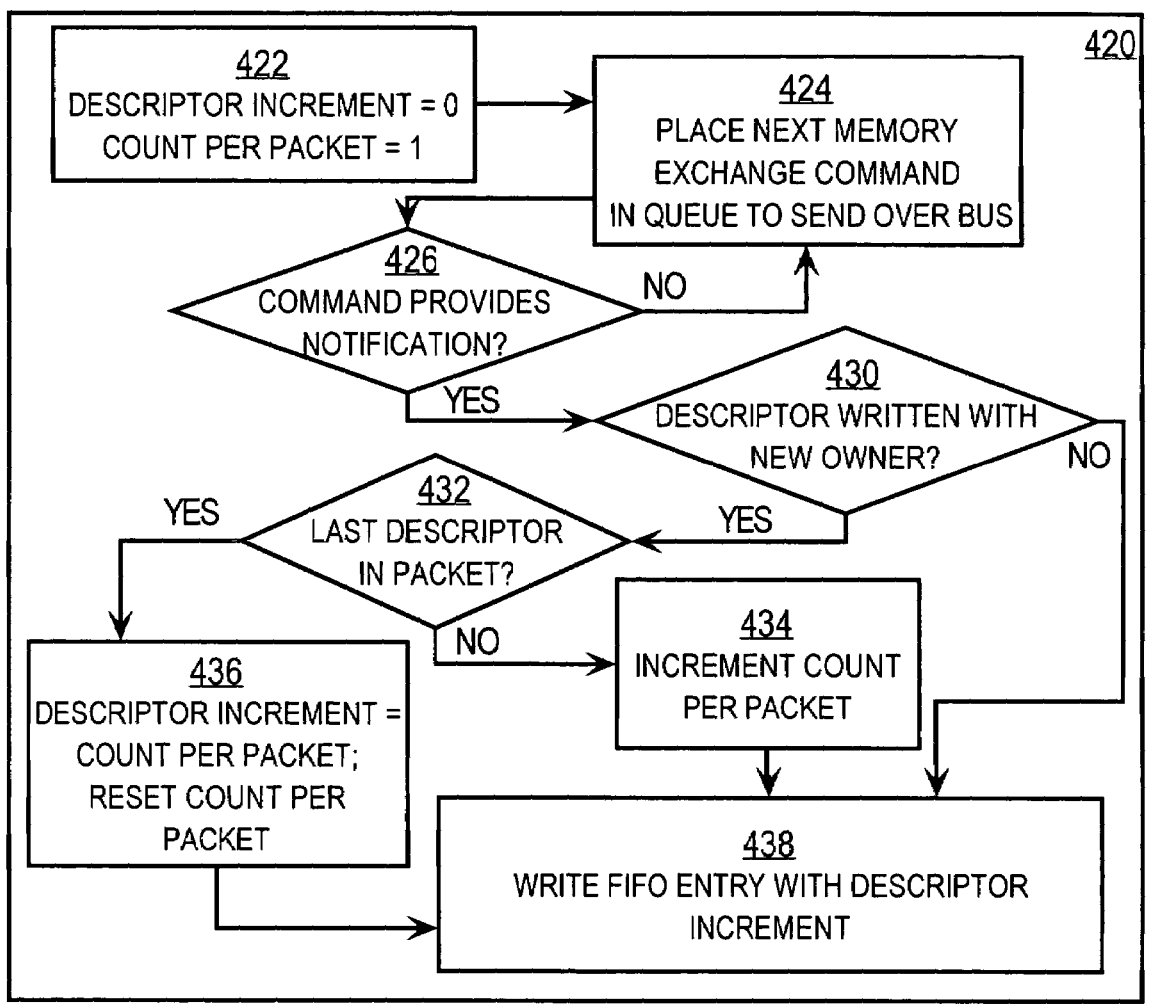
FIG. 4A is a flow diagram that illustrates a step of the method of FIG. 3A, according to an embodiment.

FIG. 4A is a flow diagram that illustrates a step 320 of the method of FIG. 3, according to an embodiment 420. Step 420 is a particular embodiment of step 320. In step 420, notification memory commands, such a posted writes on device bus 412 (or non-posted commands on routers without bus-acknowledged posted writes), are used.

In FIG. 4A and the following discussion, two parameters are defined and utilized. These parameters correspond to one or more available registers (not shown) on DMA block 280.

The first parameter holds data that indicates a number of descriptors for which the ownership is transferred to the CPU as a result of the current memory exchange command. In the illustrated embodiments, this parameter has a value of zero for reads, has a value of zero for writes that are not to a descriptor in the DMA's descriptor ring, and has a value of zero for writes to a descriptor that do not change ownership to the CPU. In some embodiments, this parameter has a value of one (1) for a write to a descriptor that changes ownership to the CPU. In some embodiments that update public head pointers and counters only on packet boundaries, this parameter has a value equal to the total number of descriptors used by the data packet when the last descriptor for the packet in which ownership is changed to CPU is placed in queue 284, and has a value of zero (0) for the other descriptors for the data packet, even if ownership is changed. The first parameter is called the descriptor increment parameter in the following.

The second parameter holds data that indicates a running total of how many descriptors have been written for the current data packet. The second parameter is called the count per packet parameter in the following. The second parameter is used in embodiments in which the public head pointer and counter register contents are determined only for data packet boundaries.

According to step 420, when the notification memory command is inserted in queue 284, the value of the descriptor increment parameter is stored in FIFO array 296 in a FIFO entry 297 that corresponds to the order the command is placed in queue 284. As described in more detail below with reference to FIG. 4B, when notification is received for that command, the value of this FIFO entry is next out and is thus retrieved from the FIFO array 296.

In step 422, the two parameters are initialized. A value for the descriptor increment parameter is set to zero and a value for a count per packet parameter is set to one.

In step 424, the next memory exchange command is placed on the queue to be sent over the data bus. For example, a descriptor read command is placed to get a pointer to a buffer for the incoming data packet. Control then passes to step 426.

In step 426, it is determined whether the command produces notification, such as a response or acknowledgement. If not, no entry is to be made to the FIFO, because there will be no corresponding notification to pop the entry off the FIFO. Control passes back to step 424 to place the next memory exchange command on the queue. For purposes of illustration, it is assumed that the device bus does not provide notification for reads, and control passes back to step 424 for the next command. It is further assumed that the next command is a posted write to a first buffer of a first data packet as determined by the read issued in the first command.

If it is determined in step 426 that the command produces notification, then control passes to step 430. In some embodiments, all commands produce notification and step 426 is omitted, and control passes directly to step 430. In some embodiments only certain non-posted writes produce notification.

In step 430, it is determined whether a descriptor is written with a new owner, e.g., the CPU. If not, then the DMA is not ready to move to the next descriptor and no head pointers will be updated. In some embodiments, all writes to the descriptor change the owner, and step 430 merely checks whether the write is to a descriptor or not.

If it is determined in step 430 that a descriptor is not written with a new owner in the current command, then control passes to step 438 to add a FIFO entry to the FIFO array 926 with the current value of the descriptor increment parameter. It is assumed that the current command is a buffer write, therefore the current command is not a descriptor write and control passes to step 438 to write the current value (zero) of the descriptor increment parameter in FIFO array. The progression of entries in the FIFO array are illustrated in Table 1. In Table 1, time, packets, buffers and descriptors are distinguished by ordinals beginning with zero, e.g., different times are indicated by elapsed time values of 0, 1, 2, 3 etc. As seen in the first row, at time 0 the read of descriptor 0 is not associated with notification and therefore did not merit a FIFO entry. The next command at time 1 is a write of buffer 0 for packet 0. Because this is determined in step 430 not to be a descriptor write, control passed to step 438 to write the current value of the descriptor increment (0) to the FIFO entry. The time 1 result is listed in the second line of Table 1. It is assumed for purposes of illustration that the current packet 0 spans four buffers: 0, 1, 2, 3. The results for the posted writes at times 2, 3 and 4 for buffers 1, 2 and 3 are similar to the time 1 results, as shown in the next three lines of Table. 1.

TABLE 1

Temporal progression of FIFO entries in FIFO array according to an example.

| Elapsed time | Memory operation | Packet | Buffer | descriptor | FIFO entry |
|---|---|---|---|---|---|
| 0 | read | — | — | 0 | — |
| 1 | write | 0 | 0 | — | 0 |
| 2 | write | 0 | 1 | — | 0 |
| 3 | write | 0 | 2 | — | 0 |
| 4 | write | 0 | 3 | — | 0 |
| 5 | write | 0 | — | 0 | 0 |
| 6 | write | 0 | — | 1 | 0 |
| 7 | write | 0 | — | 2 | 0 |
| 8 | write | 0 | — | 3 | 4 |

If it is determined in step 430 that a descriptor is written with a new owner in the current command, then control passes to step 432. In step 432 it is determined whether the current descriptor is the last descriptor for the packet. Any method may be use to determine this. For example, in some embodiments, the data in packet portion field 258 is used. In some embodiments, a field in packet portion field 258 indicates whether the current descriptor is the last in the data packet. If so, then step 430 is determined based directly on the contents of this field. In some embodiments, a first descriptor and a length of the packet is held in a packet portion field 258 in the first descriptor, and the number of descriptors is determined by dividing the length of the packet (obtained in the first descriptor) by the buffer size.

If it is determined in step 432 that the current descriptor is not the last descriptor for the packet, then control passes to step 434 to increment the value in the count per packet parameter. For example, for the first descriptor written at time 5, it is determined in step 432 that the descriptor is not the last for the current packet 0, therefore control passes to step 434. In step 434, the value in the count per packet is incremented from 1 to 2. At time 5 the value of the descriptor increment parameter is still zero (0) and the value of the cont per packet parameter is now two (2). The value two indicates that at least two descriptors are used for the current packet, e.g. packet 0.

After step 434, control passes to step 438, as described above. The next FIFO entry is written with the current value of the descriptor increment parameter, e.g., 0. This result is shown in Table 1 at time 5.

The process described above for descriptor 0 is repeated for the next two descriptors, descriptor 1 and descriptor 2. The count per packet is incremented with each of these descriptors, to three (3) and four (4) respectively. However, the descriptor increment parameter value remains zero (0). Thus the FIFO entries for time 6 and time 7 are the same as for time 5, as is shown in Table 1. After time 7, the descriptor increment parameter has a value zero (0) and the count per packet parameter has a value four (4).

If it is determined in step 432 that the current descriptor is the last descriptor for the packet, then control passes to step 436. In step 436 the descriptor increment parameter value is set equal to the count per packet parameter value and the count per packet parameter value is reset to its initialized value. For example, when the fourth descriptor, descriptor 3, is written, it is determined in step 432 that this is the last descriptor for the current packet, packet 0. Control passes to step 436. In step 436 the descriptor increment is set equal to 4 (the value of the count per packet parameter), and the count per packet parameter is reset to 1. Control then passes to step 438.

In step 438, the next FIFO entry is written with the current value of the descriptor increment parameter, e.g., 4. This result is shown in Table 1 at time 8.

In some embodiments, the descriptor increment is not based on packet boundaries but is one (1) for descriptor writes and zero (0) for other memory commands. In some such embodiments steps 432 and step 434 are omitted. In some of these embodiments, the descriptor increment parameter and the count per packet parameter are also omitted; and each FIFO entry written for a descriptor has a value one (1).

Figure 4B:
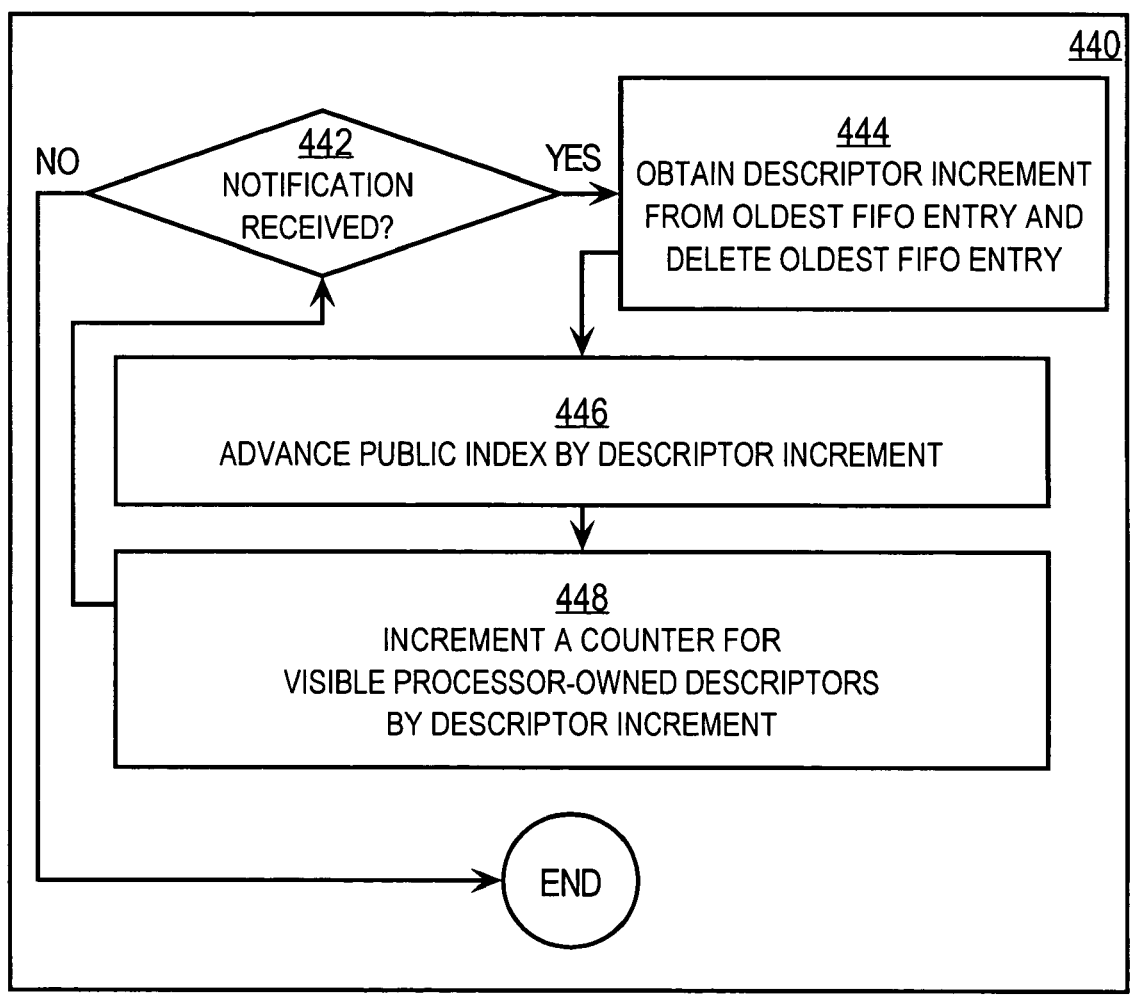
FIG. 4B is a flow diagram that illustrates another step of the method of FIG. 3B, according to an embodiment.

FIG. 4B is a flow diagram that illustrates step 340 of the method of FIG. 3B, according to an embodiment 440. Step 440 is a particular embodiment of step 340. In step 440, notification is received for memory commands, such as from posted writes on device bus 412.

In step 442, it is determined whether a notification is received. Any method known in the art may be used. For example, notifications are stacked in an input queue and processed, e.g., during step 440. If the queue is empty, it is determined that no notification has been received. In the illustrated embodiments, step 440 is performed continuously in a background process by a portion of the DMA block.

If it is determined that a notification is received, control passes to step 444. For example, if a bus acknowledgement is received from device bus 412, control passes to step 444. In step 444, a descriptor increment is obtained from the oldest FIFO entry in FIFO array 296 and that entry is removed from the FIFO. Control then passes to step 446. For the example of Table 1, when the first notification is received, the oldest FIFO entry, at time 1, is retrieved, the descriptor increment value 0 is obtained and the entry is deleted from the FIFO array.

In step 446, the public index in the public head pointer register 292 is advanced by the amount of the descriptor increment. If the increment advances past the end of the descriptor ring portion of memory, a situation named a wrap-condition, then the index is automatically adjusted to the beginning of the descriptor ring portion of memory. Control then passes to step, 448. It is assumed for purposes of illustration that the public index in the public head pointer register 292 has a value of AAA0 after initialization. In the example of Table 1, the public index value is advanced by zero during step 446 after the first notification, and thus the public index remains AAA0.

In step 448, the value in the counter register 294 for visible CPU-owned descriptors is incremented by the value of the descriptor increment obtained from the FIFO entry. It is assumed for purposes of illustration that the count in the counter register 294 has a value of zero after initialization. In the example of Table 1, the count is incremented by zero during step 448 after the first notification, and thus the count remains zero. Control then passes back to step 442.

In some embodiments, step 448 is omitted, and the counter register is not updated based on CPU-owned descriptors visible to the CPU.

In the example of Table 1, as notifications are received for the posted writes to buffers 1, 2 and 3 and descriptors 0, 1, 2 and 3 of packet 0, the corresponding FIFO entries are popped off the FIFO array 296 and used to advance the public index and counter. Only when the eighth notification (with the first non zero descriptor increment) is received, however, are the values of the public index and counter actually changed. After the eighth notification, the public index in public head pointer register 292 is AAA4 and the count in the counter register is 4.

It is assumed for purposes of illustration that, by the time the DMA receives the eighth notification, the DMA has completed a second, three-buffer data packet 1, and the private head pointer register contains the value AAA7. If a CPU were to request the head pointer after the eighth notification and before a 14$^{th}$ notification, the CPU would receive a value of AAA4 for the public head pointer instead of the value AAA7 for the private head pointer. Thus the DMA will next write a descriptor at AAA7 but the CPU will only process the four descriptors from AAA0, inclusive, to AAA4, exclusive.

Using the techniques described here, a CPU seeking to process CPU-owned descriptors for a particular network interface, either in response to an interrupt or not, receives a value for a public head pointer that is guaranteed to terminate a range of descriptors that are owned by the CPU. This saves the CPU from expending resources checking the ownership of each descriptor. In addition, when the value of the head pointer is determined to represent only packet boundaries, the CPU is spared from expending resources to terminate or restart processing mid-packet. Overall performance of the device implementing these techniques is expected to improve compared to prior art approaches.

5.0 Router Hardware Overview

Figure 5:
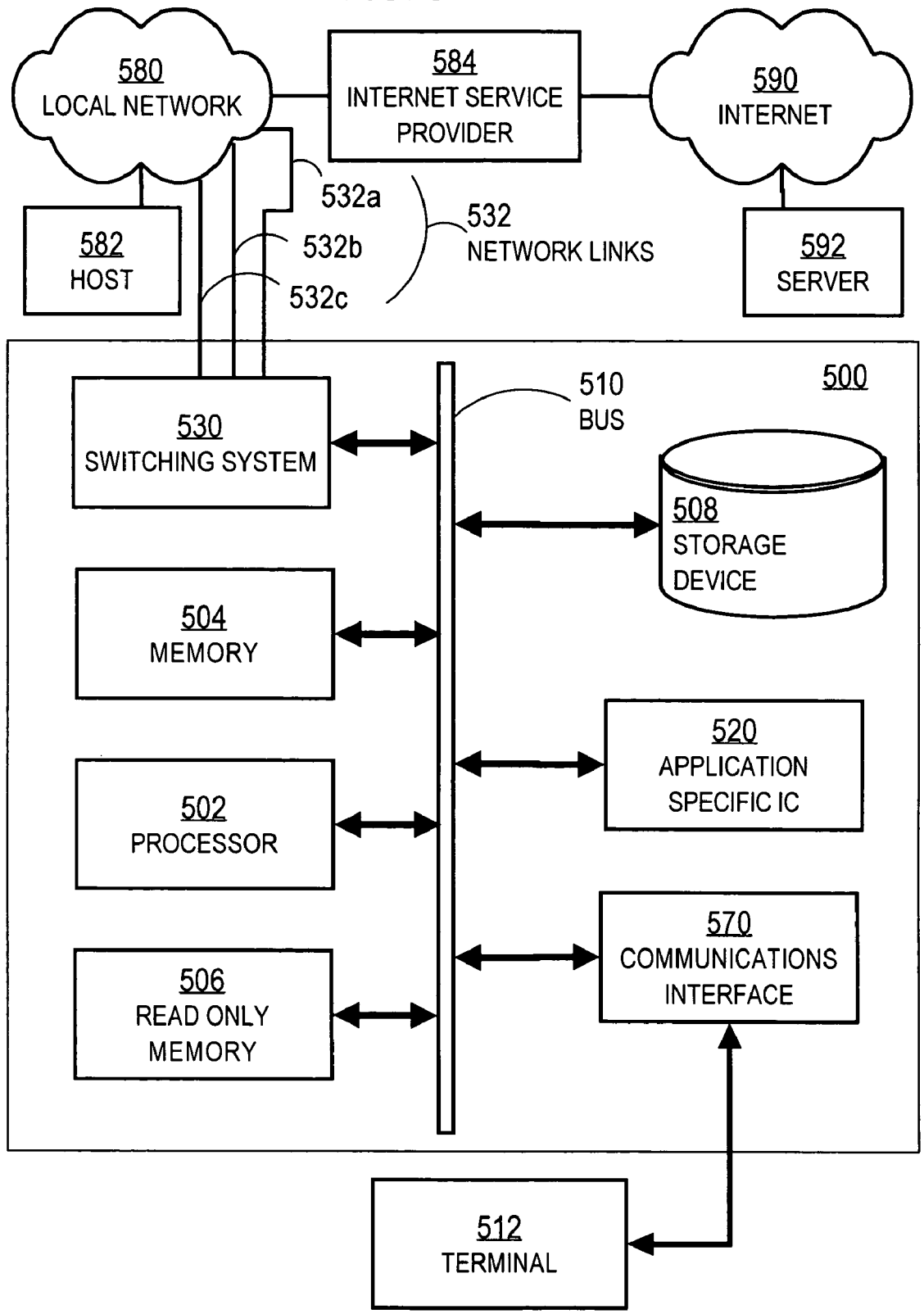
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular, atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of an Application Specific Integrated Circuit (ASIC) include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to a network provides service in response to information received over a network. In the illustrated example, server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 or switching system 530 executing one or more sequences of one or more instructions contained in memory, such as memory 504. Such instructions, also called software and program code, may be read into memory, such as memory 504, from another computer-readable medium such as storage device 508. Execution of the sequences of instructions contained in memory causes processor 502 or switching system 530 or both to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software unless otherwise explicitly stated.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 or switching system 530 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface 570 receives the instructions and data carried in the infrared signal and places information representing the instructions and data onto bus 510. Bus 510 carries the information to memory 504 from which processor 502 or switching system 530 retrieves and executes the instructions using some of the data sent with the instructions. The instructions and data received in memory 504 may optionally be stored on storage device 508, or switching system 530 either before or after execution by the processor 502 or switching system 530.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for synchronizing use of buffer descriptors for shared packet data in memory, comprising:
   a network interface that is coupled to a network for communicating therewith a data packet;
   one or more processors;
   one or more memory devices comprising computer-readable media for storing
      packet data for the data packet in one or more memory buffers of a plurality of allocated memory buffers for storing data from a plurality of data packets, and
      a plurality of buffer descriptors corresponding to the plurality of allocated memory buffers; and
   a data communication channel connected to the network interface, the one or more processors and the one or more memory devices,
   wherein:
      each buffer descriptor holds data that includes
         location data that indicates a location of a corresponding memory buffer and
         owner data that indicates which of the network interface and the one or more processors has current exclusive use of the corresponding memory buffer;
      the network interface includes a direct memory access (DMA) controller for exchanging data between the network interface and the one or more memory devices;
      the DMA controller includes
         a queue of memory exchange commands to be sent over the data communication channel to the one or more memory devices,
         a private index register that holds data that indicates an index to a first buffer descriptor most recently used in the queue, and
         a different public index register that holds data that indicates an index to a second buffer descriptor;
      the DMA controller is configured to send data that includes data from the public index register in response to a request, from the one or more processors, for a buffer descriptor most recently used; and
      when the second buffer descriptor is accessed by the one or more processors after receiving the data from the public index register, the contents of the second buffer descriptor are guaranteed to include owner data that indicates the one or more processors.

2. An apparatus as recited in claim 1, wherein the DMA controller is further configured to send the data that includes data from the public index register before all commands in the queue of memory exchange commands are sent over the data communication channel.

3. An apparatus as recited in claim 1, wherein the data from the public index register is guaranteed to indicate a buffer descriptor at a boundary between a first data packet and a different second data packet.

4. An apparatus as recited in claim 1, wherein:
   the DMA controller includes a counter register that holds data that indicates a number of buffer descriptors that had owner data changed to indicate the one or more processors as a result of memory exchange commands placed in the queue by the DMA; and
   the DMA controller is further configured to send, when the data in the counter register exceeds a threshold value, an interrupt to the one or more processors to begin processing memory buffers indicated in buffer descriptors by sending a request to the DMA for the buffer descriptor most recently used.

5. An apparatus as recited in claim 4, wherein the DMA controller is further configured to reset the counter register to zero when the one or more processors respond to the interrupt and request the index to the first buffer descriptor most recently used.

6. An apparatus as recited in claim 1, wherein,
in the queue, a memory exchange command for exchanging data with a buffer descriptor is associated with a notification that is received at the DMA when data exchange is effective for subsequent memory exchange commands with the same buffer descriptor sent over the data communication channel;
the DMA includes a first-in-first-out (FIFO) away of registers that hold entry data;
the entry data includes data that indicates an increment of buffer descriptors in which the owner data is changed from the network interface to the one or more processors; and
the DMA is further configured to store an entry in the FIFO for every memory exchange command entered on the queue that causes the owner data to be changed from the network interface to the one or more processors.

7. An apparatus as recited in claim 6, wherein the DMA controller is further configured to remove an oldest entry from the FIFO when the notification is received.

8. An apparatus as recited in claim 7, wherein the DMA controller is further configured to update the public index register based on the increment in the entry removed from the FIFO.

9. An apparatus as recited in claim 8, wherein:
the DMA controller includes a counter register that holds data that indicates a number of buffer descriptors that had owner data changed to indicate the one or more processors as a result of memory exchange commands placed in the queue by the DMA; and
the DMA controller is further configured to send, when the data in the counter register exceeds a threshold value, an interrupt to the one or more processors to begin processing memory buffers indicated in buffer descriptors by sending a request to the DMA for the buffer descriptor most recently used.

10. An apparatus as recited in claim 9, wherein the DMA controller is further configured to update the counter register when a notification is received for a memory exchange command in which the owner data is changed from the network interface to the one or more processors based on the increment in the entry removed from the FIFO.

11. An apparatus as recited in claim 6, wherein the data that indicates the increment of buffer descriptors is zero for buffer descriptors that do not fall on a packet boundary and is equal to the number of buffer descriptors in the data packet for a last buffer descriptor for the data packet.

12. An apparatus as recited in claim 8 wherein the data that indicates the increment of buffer descriptors is zero for buffer descriptors that do not fall on a packet boundary and is equal to the number of buffer descriptors in the data packet for a last buffer descriptor for the data packet.

13. An apparatus as recited in claim 12, wherein the DMV controller is further configured to update the public index register when a notification is received for a memory exchange command in which the owner data is changed from the network interface to the one or more processors based on the increment in the entry removed from the FIFO, whereby the pubic index register holds data that indicates a buffer descriptor that lies at a boundary between the data packet and a different data packet.

14. An apparatus as recited in claim 9 wherein the data that indicates the increment of buffer descriptors is zero for buffer descriptors that do not fall on a packet boundary and is equal to the number of buffer descriptors in the data packet for a last buffer descriptor for the data packet.

15. An apparatus as recited in claim 14, wherein the DMA controller is further configured to update the counter register when a notification is received for a memory exchange command in which the owner data is changed from the network interface to the one or more processors based on the increment in the entry removed from the FIFO, whereby the counter register holds data that indicates a number of buffer descriptors that terminate at a boundary between the data packet and a different data packet.

16. A direct memory access (DMA) controller for synchronizing use of buffer descriptors for storing data shared by the DMA controller and a different process, comprising:
means for receiving descriptor data that indicates a plurality of buffer descriptors corresponding to a plurality of memory buffers for storing a plurality of data packets, wherein each buffer descriptor holds data that includes location data that indicates a location of a corresponding memory buffer and owner data that indicates which of a network interface direct memory access
(DMA) controller and a different processor has current exclusive use of the corresponding memory buffer;
means for receiving private index data that indicates a particular buffer descriptor of the plurality of buffer descriptors, wherein the owner data of the particular buffer descriptor indicates the DMA controller, for moving data between a data port and the corresponding memory buffer;
means for placing, on a queue of memory exchange commands to be sent over a data communication channel to one or more memory devices that store the plurality of memory buffers and the plurality of buffer descriptors, a memory exchange command including the private index data to exchange data with the particular buffer descriptor and change the owner data from indicating the DMA controller to indicating the processor for subsequent use by the processor;
means for incrementing the private index data;
means for determining public index data that indicates a different buffer descriptor in which owner data most recently changed from indicating the DMA controller to indicating the processor is known to be visible to the processor;
means for receiving a request from the processor for a most recently used buffer descriptor;
means for sending the public index data to the processor in response to receiving the request from the processor, whereby, based on the public index data, the processor exchanges data with a plurality of buffer descriptors in which the owner data indicates the processor, beginning with a buffer descriptor in which the owner data changed least recently from indicating the DMA up to the different buffer descriptor.

17. A method for synchronizing use of buffer descriptors for a data packet, the method comprising the steps of:
receiving descriptor data that indicates a plurality of buffer descriptors corresponding to a plurality of memory buffers for storing a plurality of data packets transmitted through a data port, wherein each buffer descriptor holds data that includes location data that indicates a location of a corresponding memory buffer and owner data that indicates which of a network interface direct memory access (DMA) controller and a different processor has current exclusive use of the corresponding memory buffer;

receiving private index data that indicates a particular buffer descriptor of the plurality of buffer descriptors, wherein the owner data of the particular buffer descriptor indicates the DMA controller, for moving data between the data port and the corresponding memory buffer;

placing, on a queue of memory exchange commands to be sent over a data communication channel to one or more memory devices that store the plurality of memory buffers and the plurality of buffer descriptors, a memory exchange command including the private index data to exchange data with the particular buffer descriptor and change the owner data from indicating the DMA controller to indicating the processor for subsequent use by the processor;

incrementing the private index data;

determining public index data that indicates a different buffer descriptor in which owner data most recently changed from indicating the DMA controller to indicating the processor is known to be visible to the processor;

receiving a request from the processor for a most recently used buffer descriptor;

in response to receiving the request from the processor, sending the public index data to the processor, whereby, based on the public index data, the processor exchanges data with a plurality of buffer descriptors in which the owner data indicates the processor, beginning with a buffer descriptor in which the owner data changed least recently from indicating the DMA up to the different buffer descriptor.

18. A method as recited in claim 17, said step of sending the public index data to the processor further comprising sending the public index data to the processor before sending all the memory exchange commands in the queue over the data communication channel to the one or more memory devices.

19. A method as recited in claim 17, said step of determining the public index data further comprising determining the public index data for the different buffer descriptor at a boundary between a first data packet and a different second data packet.

20. A method as recited in claim 17, further comprising the step of incrementing a count in a counter register that indicates a number of buffer descriptors known to be visible to the processor and with owner data that indicates the processor.

21. A method as recited in claim 20, further comprising the steps of:

determining whether the count in the counter register is less than a threshold; and if it is determined that the count is not less than the threshold, then initiating an interrupt to cause the processor to begin processing buffer descriptors that have owner data that indicates the processor by requesting from the DMA controller a most recently used buffer descriptor at which processing by the processor is to terminate.

22. A method as recited in claim 21, further comprising the steps of, determining whether the processor has responded to the interrupt and requested the most recently used buffer description; and if it s determined that the processor has responded to the interrupt and requested the most recently used buffer description, then setting the counter to zero, whereby the counter indicates the number of buffer descriptors visible to the processor since the last interrupt.

23. A method as recited in claim 17, wherein:

said step of placing on the queue the memory exchange command to change owner data from indicating the DMA controller to indicating the processor further comprises placing on the queue a memory exchange command that causes a notification to be returned when a result of the memory exchange command is visible to the process; and said step of determining the public index data further comprises determining the public index data when the notification is received.

24. A method as recited in claim 23, step of determining the public index data further comprises:

when a command that includes a change in the owner data from the DMA controller to the processor is placed on the queue, adding to a first-in-first-out (FIFO) register array a FIFO entry that holds increment data that indicates a number of buffer descriptors to advance an index in the public index data;

when the notification is received, then determining a current number to advance an index in the public index data based on the increment data in an oldest FIFO entry in the FIFO register array; and deleting the oldest FIFO entry from the FIFO register array, wherein said step of determining the public index data further comprising advancing an index indicated by the public index data by the current number.

25. A method as recited in claim 23, said step of placing on the queue the memory exchange command to change owner data further comprising placing a non-posted write that causes notification to be sent from a memory device.

26. A method as recited in claim 23, said step of placing on the queue the memory exchange command to change owner data further comprising placing a posted write to a data communication channel that sends an acknowledgment when the channel causes subsequent exchanges with the same memory location to be executed after the posted write.

27. A method as recited in claim 24, said step of adding the FIFO entry to the FIFO register array further comprising setting the increment data to indicate advancing one buffer descriptor in entries for buffer descriptors.

28. A method as recited in claim 24, said step of adding the FIFO entry to the FIFO register array further comprising setting the increment data to indicate advancing zero buffer descriptors in entries for buffer descriptors that are not on a boundary with a different data packet.

29. A method as recited in claim 28, said step of adding the FIFO entry to the FIFO register array further comprising setting the increment data to indicate advancing the number of buffers holding the packet data in the last buffer descriptor for the data packet, whereby the public index data always indicates a packet boundary.

30. A method as recited in claim 24, further comprising the step of incrementing by the current number a count in a counter register that indicates a number of buffer descriptors known to be visible to the processor and with owner data that indicates the processor.

* * * * *

UNITED STATES PATENT AND TRADEMARK OFFICE
CERTIFICATE OF CORRECTION

PATENT NO. : 7,461,180 B2 Page 1 of 1
APPLICATION NO. : 11/430116
DATED : December 2, 2008
INVENTOR(S) : Lee et al.

It is certified that error appears in the above-identified patent and that said Letters Patent is hereby corrected as shown below:

On the Title page, item [75], Inventors, line 2: change spelling of inventor's name from "Gamer" (GAMER) to "Garner" (GARNER)

In Claim 6, line 8 (column 21, line 16) change "away" to "array";

In Claim 13, line 1 (column 21, line 62) change "DMV" to "DMA"

Signed and Sealed this

Tenth Day of March, 2009

JOHN DOLL
*Acting Director of the United States Patent and Trademark Office*